United States Patent [19]

Miyama et al.

[11] Patent Number: 4,980,613

[45] Date of Patent: Dec. 25, 1990

[54] FLAT CRT DISPLAY APPARATUS

[75] Inventors: Hiroshi Miyama, Yokohama; Yoshikazu Kawauchi, Kawasaki; Kaoru Tomii, Isehara; Jun Nishida, Tokyo, all of Japan

[73] Assignee: Matsushita Electric Industrial Co., Ltd., Japan

[21] Appl. No.: 308,328

[22] Filed: Feb. 7, 1989

[30] Foreign Application Priority Data

Feb. 8, 1988 [JP] Japan ............... 63-27099
Mar. 15, 1988 [JP] Japan ............... 63-61010
Aug. 17, 1988 [JP] Japan ............... 63-204303

[51] Int. Cl.⁵ ............................ H01J 29/70
[52] U.S. Cl. ......................... 315/366; 313/422
[58] Field of Search .................. 315/366; 313/422

[56] References Cited

U.S. PATENT DOCUMENTS

| | | | |
|---|---|---|---|
| 3,723,786 | 3/1973 | Charles | 313/422 |
| 4,158,210 | 6/1979 | Watanabe | 315/366 |
| 4,167,690 | 9/1979 | Gange | 315/366 |
| 4,359,671 | 11/1982 | Gange | 315/366 |
| 4,598,227 | 7/1986 | Credelle | 313/422 |
| 4,626,899 | 12/1986 | Tomii et al. | 315/366 |
| 4,714,863 | 12/1987 | Yokoyama et al. | 315/366 |

*Primary Examiner*—Gregory C. Issing
*Attorney, Agent, or Firm*—Lowe, Price, LeBlanc, Becker & Shur

[57] ABSTRACT

A flat CRT apparatus has a set of vertical scanning deflection electrodes arrayed down one flat inner face of the CRT, spaced apart from an opposing face having a photo-emissive layer formed thereon, and an electron gun for emitting a single flat electron beam or a row of narrow line electron beams into the space between the scanning electrodes and the photo-emissive layer. Vertical scanning of a raster display is executed by scanning voltages sucessively applied to the scanning electrodes, with the deflected electron beams thus obtained being then horizontally swept in common by a horizontal deflection electrode, so that each electron beam is utilized to display a large number of picture elements of each horizontal scanning line of the display picture.

32 Claims, 15 Drawing Sheets

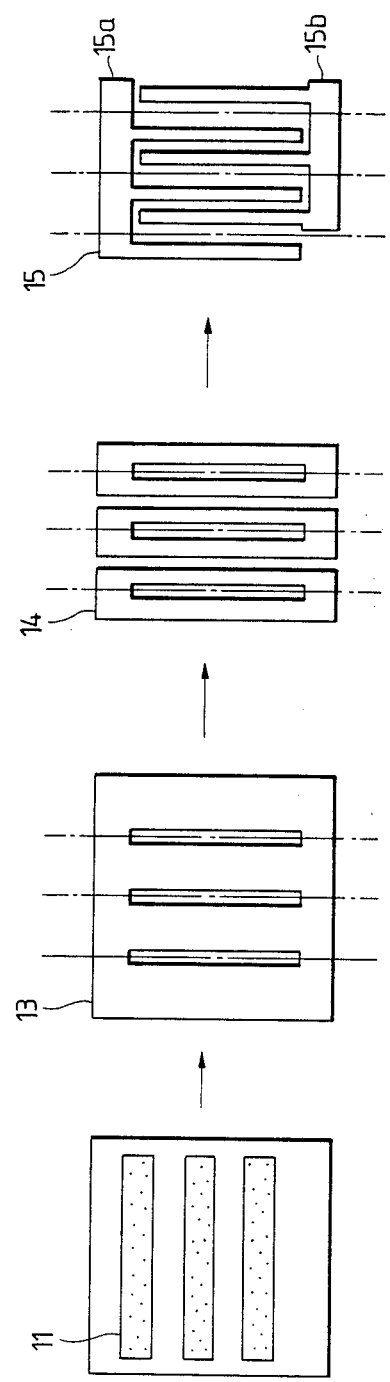

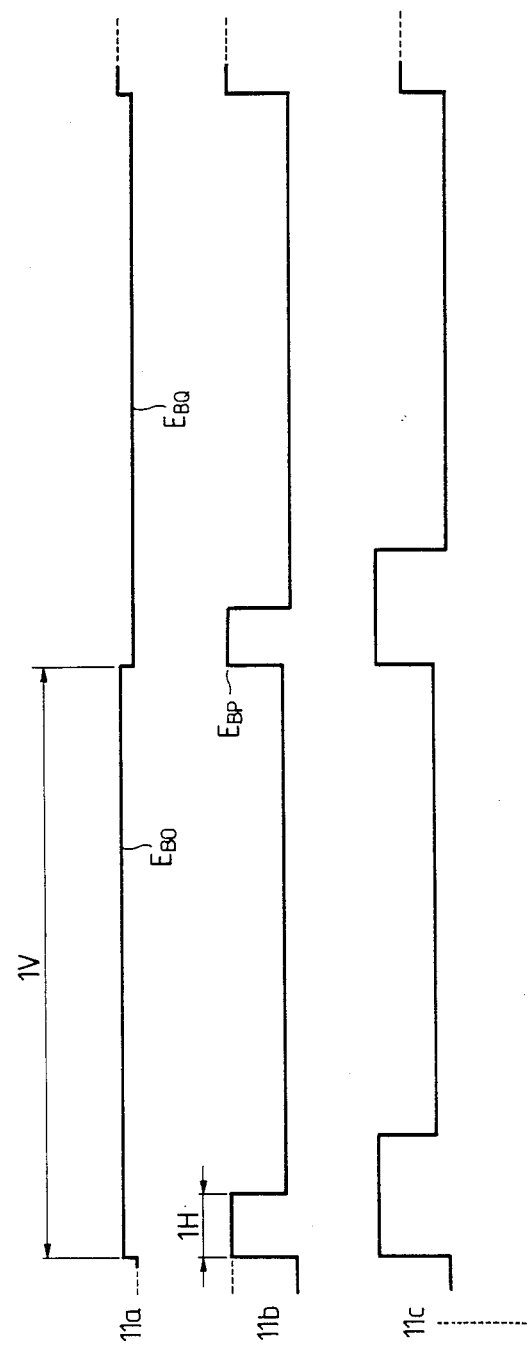

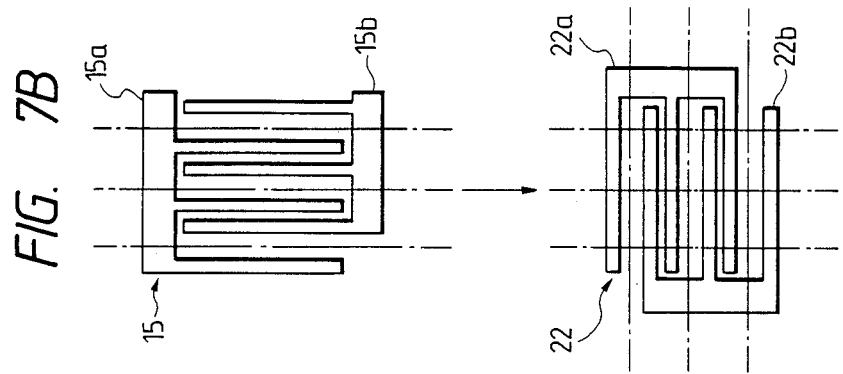
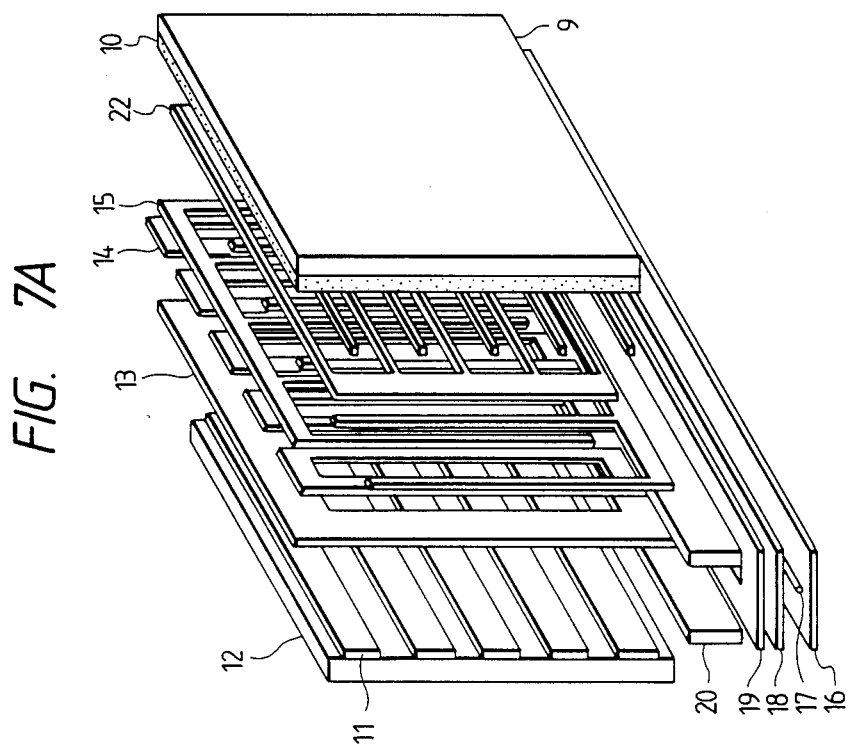

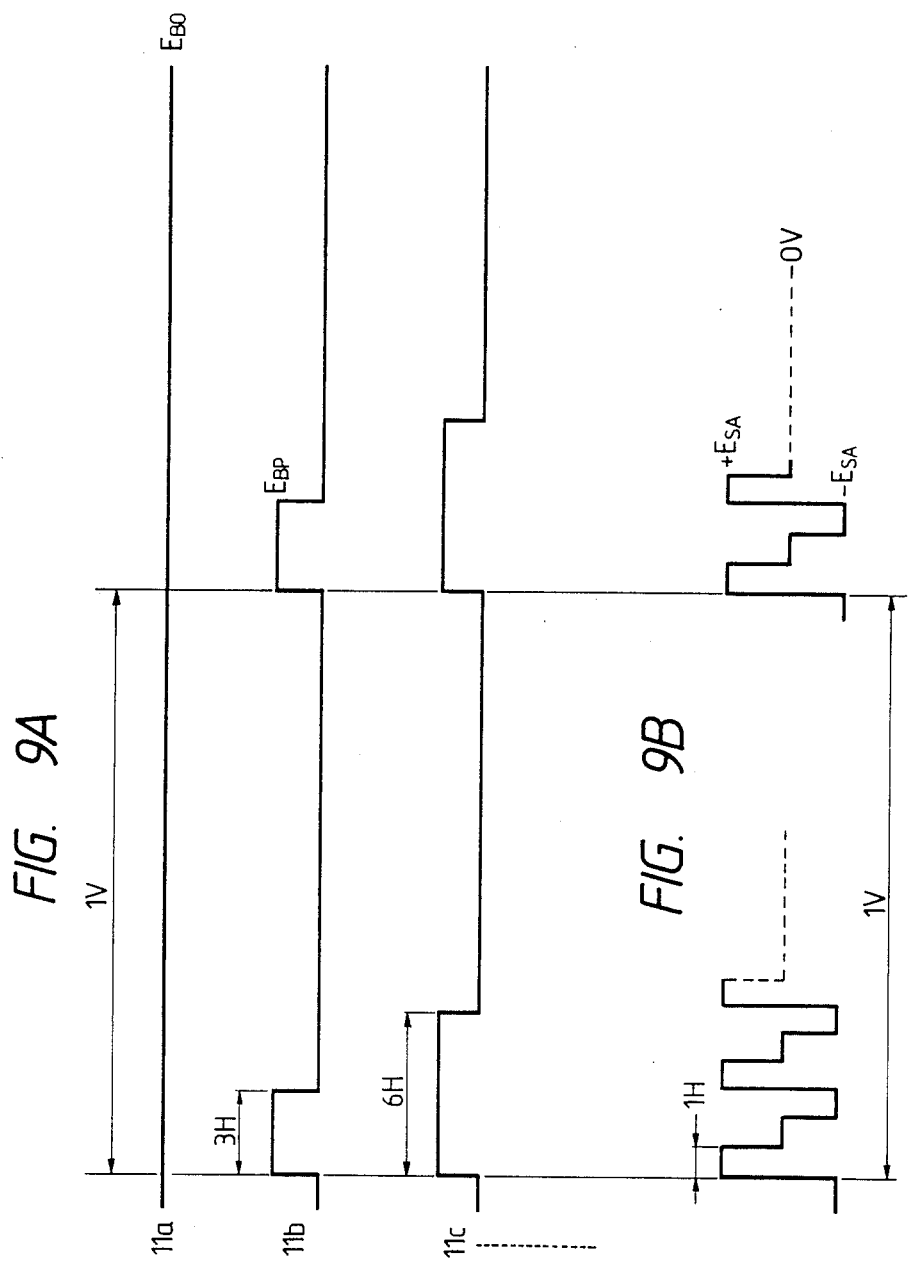

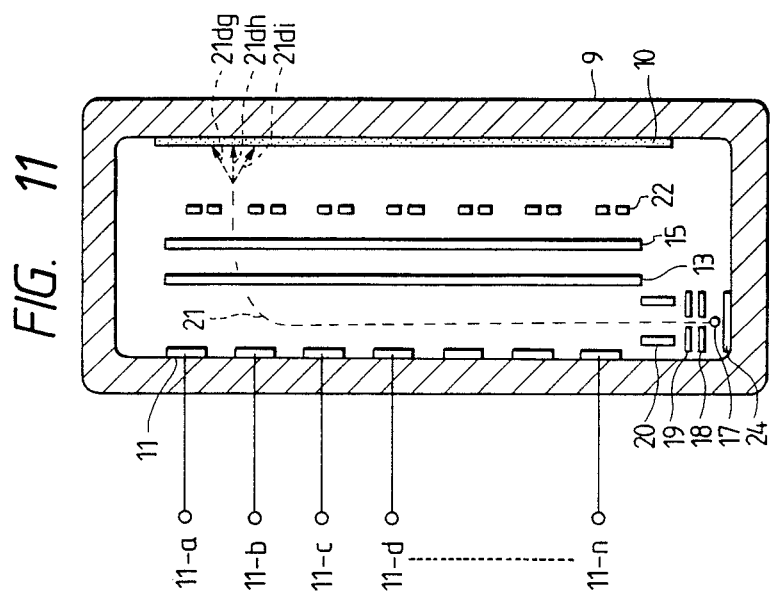
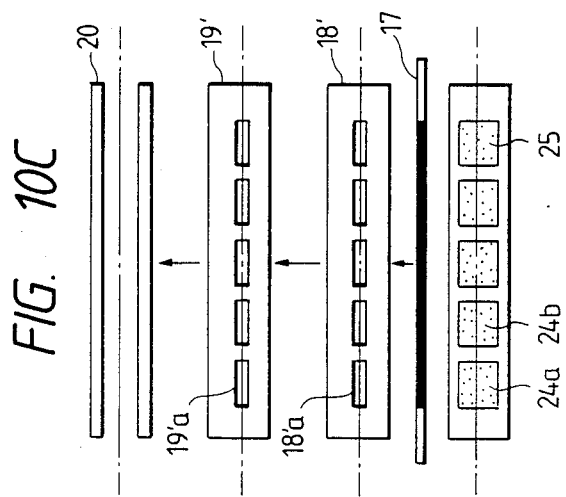

FLAT CRT DISPLAY APPARATUS

BACKGROUND OF THE INVENTION

The present invention relates to a cathode ray tube display apparatus having a flat configuration, for use in a television receiver, computer display terminal, etc.

The cathode ray tube (hereinafter designated as CRT) type of display is widely utilized for displaying images, characters, etc. in various applications. Various proposals have been made in the prior art for making such a CRT display apparatus more compact than has been possible hitherto, by making the overall shape of the apparatus substantially thin and flat. One such proposal is made in U.S. Pat. No. 3,723,786. The general configuration of this proposed apparatus is as shown in FIG. 1A. A photo-emissive layer 2 is formed in an inner surface of a flat transparent front portion 1 of an evacuated envelope. A vertically extending array of horizontally elongated vertical scanning deflection electrodes 3 is formed on an inner face of a rear portion 4 of the evacuated envelope, which is disposed parallel to the front portion 1 with a narrow space left between the portions 1 and 4, the vertical scanning deflection electrodes 3 being arrayed with a fixed pitch in the vertical direction. An electron gun is formed by a line cathode 5, a first grid 6, a modulation electrode 7, and a shield electrode 8, with the modulation electrode 7 being positioned between the electrodes 6 and 8 as shown. The line cathode 5, grid electrodes 6 and 8 and modulation electrode 7 are shown separately in plan views in FIG. 1B. The line cathode 5 has electron-emitting segments 5a formed at regular spacings along its length, while the electrodes 6 to 7 have respective rows of apertures 6a, 7a, 8a formed therein with a common pitch which is identical to that of the electron-emitting portions 5a of the line cathode 5. The electrodes 6 and 8 are electrically conductive, and are connected to respective fixed potentials, while the modulation electrode 7 is formed of an electrically non-conductive material and has an "eyelet" of conducting material formed around the periphery of each aperture 7a, with respective modulation signlas being applied to these eyelets. The picture element 2 is connected to a high voltage $V_D$, so that a horizontally extending set of vertically directed electron beams are emitted through the apertures in the electrodes 6 to 8 and into the space between the picture element 2 and the vertical scanning deflection electrodes 3, as indicated by the upwardly extending broken line in FIG. 1A. By applying the voltage $V_D$ to a lower set of the vertical scanning deflection electrodes 3 and a more negative voltage $(V_D-V_C)$ to an upper set of the vertical scanning deflection electrodes as shown, all of the electron beams are deflected towards the picture element 2, when they reach the first vertical scanning deflection electrode which is connected to the $(V_D-V_C)$ potential. Thus, raster scanning of such a display device can be performed applying sequential scanning voltages to the vertical scanning deflection electrodes 3 while modulating the respective intensities of the electron beams, so that an image such as a television picture can be displayed, if the number of the vertical scanning deflection electrodes is made substantially equal to the number of horizontal scanning lines of the display picture and the number of apertures of each of the electrodes 6 to 8 is made substantially equal to the number of picture elements of the display picture.

However such a display apparatus has some serious disadvantages. Firstly, since the number of electron beams that must be produced by the electron gun is equal to the number of picture elements in each horizontal scanning line of the display image, a very large number of electron beams must be produced which are positioned with very close mutual spacings. In the case of a usual CRT display television receiver, the pitch of the picture elements along the horizontal direction is approximately 0.1 to 0.2 mm. In order to generate a set of electron beams which are separated by such a small pitch, and to modulate these beams, it is necessary to execute very precise machining operations to form the components of the electron gun, while in addition practical problems will arise with forming electrical connections to the modulation electrode 7, for applying modulation signals for the respective electron beams.

Furthermore, since a substantial distance is traversed by each electron beam from the point of leaving the electron gun (in which beam focusing and directing is implemented) to the point of incidence upon the picture element 2, it is difficult to avoid errors in the respective positions at which the beams fall upon the picture element 2. In addition, it is difficult to ensure that emitted-light spots of uniform diameter are produced by the electron beams over the entire display area. Variations in spot diameter will result in corresponding variations in display luminance, while in the case of a color television display, variations in spot size or errors in beam landing position will result in color errors in the displayed image. Thus, considerable problems would result if it were attempted to use such a prior art display apparatus to display characters or images with a normally acceptable level of display resolution.

Another problem arises with such a prior art display apparatus, which is not significant when the display area is small. That is, in the case of a large display area, the length of the cathode of the electron gun will be of substantial length. In general, such a cathode is formed as a line cathode, which is supported under tension by springs at each end such as to be supported in a free-floating condition. Thus, such a cathode is very susceptible to the effects of vibration, which can result in instability of the level of electrons emitted from the cathode. This produces visible noise on the display, and also varies the electron beam landing positions, so that a reliably clear display cannot be ensured.

SUMMARY OF THE INVENTION

It is an objective of the present invention to provide a flat cathode ray tube display apparatus which overcomes the problems of the prior art set out hereinabove. More specifically, it is an objective of the present invention to provide a flat cathode ray tube display apparatus by the accuracy of control of electron beam trajectories is increased over the prior art, and whereby a uniform beam spot diameter can be produced over the entire display area of the apparatus.

It is a further objective of the present invention to provide a flat cathode ray tube display apparatus having a single electron gun, whereby each of a plurality of commonly deflected electron beams is utilized to display a plurality of picture elements in a horizontal scanning line of a display picture.

It is moreover an objective of the present invention to provide a flat cathode ray tube display apparatus having an electron gun including a line cathode, whereby vibration of the line cathode can be suppressed and display image stability thereby enhanced.

To achieve the above objectives, a display apparatus according to one embodiment of the present invention includes means for generating and successively vertically deflecting a plurality of electron beams aligned as a horizontal row at intervals with a fixed pitch, and means for modulating the beams and for periodic horizontal deflection of the electron beams in common to sweep the beams across respective portions of a photo-emissive layer, such that each of the electron beams functions to display a plurality of picture elements of each horizontal scanning line of a display picture produced by the apparatus. Alternatively, a single electron beam is first produced in the shape of a thin sheet beam from an electron gun, and this beam is then successively vertically deflected, with the deflected beam being then converted to a plurality of thin line electron beams which are respectively modulated and periodically horizontally deflected to execute respective horizontal sweeps across a photo-emissive surface.

More specifically, a first embodiment of a flat cathode ray tube display apparatus according to the present invention comprises:

an evacuated envelope having flat mutually opposing first and second portions, with at least the first envelope portion being optically transparent and having a photo-emissive layer of a fluoroescent material formed over a rectangular region of an inner surface of the first envelope portion, the rectangular region having respective sides thereof extending in a horizontal and a vertical direction, and with a set of vertical scanning deflection electrodes formed as elongated conductive strips arrayed with a fixed pitch upon an inner surface of the second envelope portion;

an electron gun disposed within the envelope, extending between the first and second envelope portions, for emitting an electron beam into a region between the vertical scanning deflection electrodes and photo-emissive layer and for forming the electron beam as a thin flat sheet aligned substantially parallel to the photo-emissive layer;

means for applying scanning voltages to the vertical scanning deflection electrodes for producing deflection of the electron beam towards the photo-emissive layer by successive ones of the vertical scanning deflection electrodes;

shield electrode means disposed between the vertical scanning deflection electrodes and photo-emissive layer, for converting the thin sheet electron beam to a corresponding plurality of thin line electron beams directed towards the photo-emissive layer, subsequent to deflection by the vertical scanning deflection electrodes;

modulation electrode means for modulating respective ones of the plurality of electron beams; and, deflection electrode means for periodically deflecting the plurality of electron beams together, following modulation by the modulation electrode means.

According to another embodiment, a flat cathode ray tube display apparatus according to the present invention comprises;

an evacuated envelope having flat mutually opposing first and second portions, with at least the first envelope portion being optically transparent and having a photo-emissive layer of a fluoroescent material formed over a rectangular region of an inner surface of the first envelope portion, the rectangular region having respective sides thereof extending in a horizontal and a vertical direction, and with a set of vertical scanning deflection electrodes formed as elongated conductive strips successively arrayed with a fixed pitch upon an inner surface of the second envelope portion;

an electron gun disposed within the envelope, extending between the first and second envelope portions for emitting a plurality of electron beams, each of thin linear shape, into a region between the vertical scanning deflection electrodes and photo-emissive layer the electron beams being each aligned in the vertical direction and successively arrayed along the horizontal direction with a fixed pitch;

means for applying scanning voltages to the vertical scanning deflection electrodes for producing a common deflection of the electron beams towards the photo-emissive layer by successive ones of the vertical scanning deflection electrodes;

modulation electrode means for modulating respective ones of the plurality of electron beams; and, deflection electrode means for periodically deflecting the plurality of electron beams together, following deflection by the vertical scanning deflection electrodes.

In addition, an electron gun of a display apparatus according to the present invention preferably includes a line cathode which is held in contact with a surface of a supporting member, the surface having a convex curved contour which is an arc of a circle.

BRIEF DESCRIPTION OF THE DRAWINGS

FIG. 2B shows respective views in elevation of vertically oriented beam control and deflection electrodes in the first embodiment;

FIG. 5C is a waveform diagram of modified scanning voltages applied to the vertical scanning deflection electrodes in the first embodiment, whereby interlace scanning is implemented;

FIG. 7A is an oblique partial view of a second embodiment of a flat CRT display apparatus according to the present invention;

FIG. 7B shows vertically oriented focusing and deflection electrodes utilized in the second embodiment;

FIG. 9A is a waveform diagram of scanning voltages applied to a set of vertical scanning deflection electrodes in the second embodiment, and FIG. 9B shows corresponding deflection voltages applied to a vertical deflection electrode of the second embodiment;

FIG. 10C illustrates components of an electron gun of the first embodiment;

FIG. 11 is a cross-sectional view in elevation of the third embodiment;

DESCRIPTION OF PREFERRED EMBODIMENTS

Figure 2A:
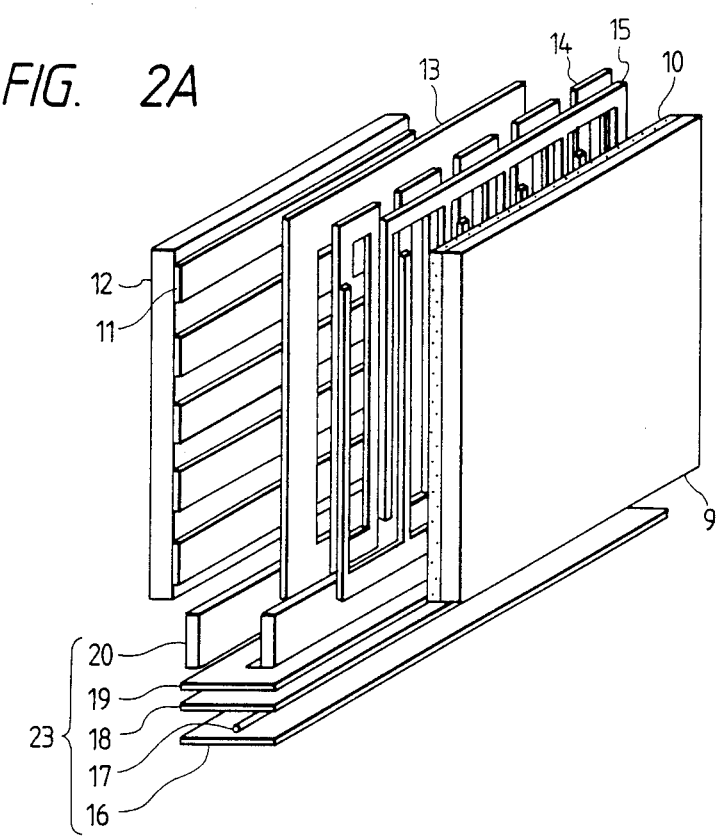
FIG. 2A is an oblique partial view of a first embodiment of a flat CRT display apparatus according to the present invention.

FIG. 2A shows an oblique partial view of the general configuration of a first embodiment of a flat CRT display apparatus according to the present invention. Numeral 9 denotes a flat transparent front portion of an evacuated envelope of the CRT, with the envelope being formed of glass in this embodiment. A photo-emissive layer 10 formed of a fluorescent material is formed over an inner face of the portion 9, this layer being shaped as a rectangle having sides aligned along a horizontal direction and a vertical direction, which respectively define horizontal and vertical directions of a raster-scan picture displayed by the apparatus. For high display brightness, a metallic back layer is preferably formed on the photo-emissive layer 10. In the case of a color display apparatus, the photo-emissive layer 10 is preferably formed as successive sets of red, green and blue-emission stripes which are vertically aligned with a fixed pitch. A set of vertical scanning deflection electrodes 11 are disposed immediately opposite the photo-emissive layer 10, spaced apart from the photo-emissive layer 10 by a fixed distance, and formed as a vertically extending array of horizontally extending elongated metallic strips upon an inner face of a flat rear portion 12 of the evacuated envelope of the CRT. It should be noted that in this specification and the appended claims, the designations "vertical" and "horizontal" respectively signify the aforementioned vertical and horizontal directions. Between the vertical scanning deflection electrodes 11 and the photo-emissive layer 10 are successively disposed three vertically aligned electrodes, each of a substantially flat shape and positioned parallel to the photo-emissive layer 10, i.e. a shield electrode 13, a modulation electrode 14 and a horizontal deflection electrode 15. These are mutually separated and separated from the vertical scanning deflection electrodes 11 and the photo-emissive layer 10 by fixed spacings, and are shown in respective elevation views in FIG. 2B.

An electron gun 23 which is of elongated form is positioned directly below the space formed between the vertical scanning deflection electrodes 11 and photo-emissive layer 10, extending in the horizontal direction.

Figure 2C:
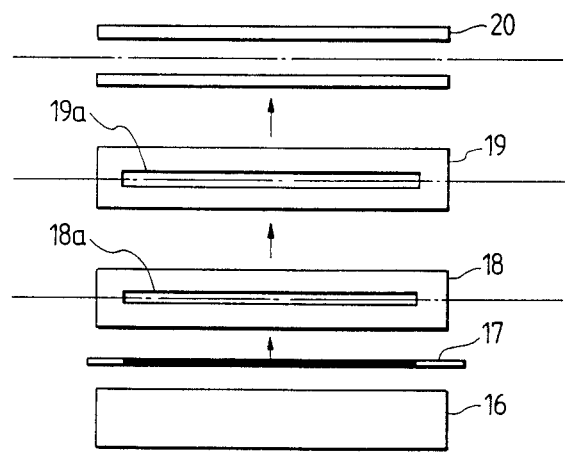
FIG. 2C shows respective plan view of components of an electron gun of the first embodiment.

The components of the electron gun 23, shown in respective plan view in FIG. 2C, are a focus electrode 20 which functions to focus an electron beam produced from the electron gun 23 and for adjusting the position of the electron beam by movement of the beam in a direction perpendicular to the photo-emissive layer 10, a G2 electrode 19 for shaping and directing the electron beam outward through the focus electrode 20, an G1 electrode 18 for controlling the electron beam, a line cathode 17 for generating electrons for the electron beam, and a back electrode 16. In FIG. 2C, the arrows indicate the direction of electron flow from the line cathode 17. As shown, the G1 electrode 18 and G2 electrode 19 have respective elongated apertures 18A, 19A formed therein, and these apertures in conjunction with the focus electrode 20 and respective fixed potentials applied to the electrodes 18 to 20 and the shield electrode 13 result in an electron beam having the form of a vertically extending thin sheet being projected from the focus electrode 20 into the space between the vertical scanning deflection electrodes 11 and the photo-emissive layer 10, this thin sheet beam being oriented substantially parallel to the photo-emissive layer 10. The line cathode 17 is formed of a length of tungsten wire which is coated with a layer of an oxide material suitable for electrode emission (i.e. a "cathode oxide"), and is held fixedly attached in a state of tension, by means of supporting members including a spring. The back electrode 16 is positioned below and closely adjacent to the line cathode 17, and functions to direct electrons, emitted from the line cathode 17 by heating, towards the electrodes 18 to 10 and hence towards the vertical scanning deflection electrodes 11. The G1 electrode 18 is positioned immediately above and closely adjacent to the line cathode 17. The focus electrode 20 is formed of two mutually parallel vertical plates which are elongated in the horizontal direction. In addition to performing focusing of the electron beam produced from the aperture of the G2 electrode 19, position adjustment of this electron beam in a direction perpendicular to the plane of photoemissive layer 10 is executed by varying a voltage difference applied between these two sections of the focus electrode 20. Although not shown in the drawings, the electrodes 16 and 18 to 20 are fixedly mounted by electrically insulating spacer members, which establish predetermined mutual spacings between these electrodes and between these electrodes and the line cathode 17 and vertical scanning deflection electrodes 11.

For simplicity of description, the configurations of the electrodes 11 to 15 are shown in FIG. 2B for the case of only three electron beams being generated and with only three vertical scanning deflection electrodes 11 being utilized. As shown, the shield electrode 13 has vertically elongated apertures formed therein for electron beam transfer which define respective narrow line beams that are emitted from these apertures (i.e. derived from the aforementioned "thin sheet" electron beam after deflection by the vertical scanning deflection electrodes 11). The modulation electrode 14 is formed of a plurality of sections which are mutually electrically isolated and coupled to receive respective modulation signals for the electron beams which pass through each of vertically elongated electron beam transfer apertures that are formed in the modulation electrode 14 as shown, these apertures being positioned in correspondence with those of the shield electrode 13. The resultant modulated electron beams then pass through respective elongated regions which are formed by the horizontal deflection electrode 15. As shown, the horizontal deflection electrode 15 consists of two comb-shaped sections 15a and 15b, having vertically extending teeth which intermesh but which have a mutual offset in the horizontal direction, thereby forming the aforementioned vertically elongated regions, having respective central axes indicated by the chain lines. The central axes of the apertures of the shield electrode 13 and modulation electrode 14 are similarly indicated by chain lines, and it can be understood that these central axes are positioned to be mutually superimposed in the CRT, as viewed in a direction perpendicular to the screen. These central axes are positioned with a fixed pitch along the horizontal direction. Although not shown in the drawings, the electrodes 13 to 15 are fixedly mounted within the CRT by electrically insulating spacer members, which establish predetermined mutual spacings between these electrodes and between these electrodes and the vertical scanning deflection electrodes 11 and photoemissive layer 10.

The vertical scanning deflection electrodes 11 can be formed on the inner face of the evacuated envelope portion 12 by a process such as hot etching or screen printing of a thin film of electrically conductive material such as aluminum, silver paste, etc. In general, the number of the vertical scanning deflection electrodes 11 is substantially identical to 1/n times the number of horizontal scanning lines of a display picture, where n is an integer.

Typical values of operating voltages applied to the various electrodes described above are: $-5$ V for the back electrode 16, 0 V for the line cathode 17, 0 V for the G1 electrode 18, $+100$ V to $+200$ V for the G2 electrode 19, 0 V for the focus electrode 20, 0 to 100 V for the vertical scanning deflection electrodes 11, $+100$ V for the shield electrode 13, $-5$ to $+30$ V for the modulation electrode 14, $+150$ V (with 200 V peak-to-peak horizontal scanning voltage superimposed) for the horizontal deflection electrode 15, and $+10$ kV for the photo-emissive layer 10.

The operation of this embodiment is as follows. Vertical scanning voltages are sequentially applied to the vertical scanning deflection electrodes 11, as described in detail hereinafter, such that at any particular instant there will be a potential applied to at least one of the vertical scanning deflection electrodes 11 that is lower than the potential applied to the shield electrode 13, while a potential that is identical to that of the shield electrode 13 is applied to all of the vertical scanning deflection electrodes 11 that are positioned below the "low potential" one of the vertical scanning deflection electrodes 11. Thus, the thin sheet electron beam that is emitted from the focus electrode 20 proceeds vertically upward between the vertical scanning deflection electrodes 11 and the shield electrode 13 until the aforementioned "low potential" one of the vertical scanning deflection electrodes 11 is reached, whereupon the beam is deflected towards the shield electrode 13. The electron beam then passes through the apertures in the shield electrode 13, thereby being formed into a horizontally extending row of thin line electron beams each of which is directed perpendicular to the photo-emissive layer 10. These electron beams then pass through respectively corresponding apertures in the modulation electrode 14, are modulated thereby, and the modulated electron beams then pass through corresponding ones of the aforementioned vertically elongated regions defined by the horizontal deflection electrode 15.

A periodic horizontal scanning voltage, e.g. having a ramp or a staircase waveform and a period which is equal to one horizontal scanning interval, is applied between the two sections 15a, 15b of the horizontal deflection electrode 15. Each of the electron beams is thereby swept across a specific corresponding portion of a horizontal scanning line of the display picture during each horizontal scanning interval. The timings of the respective modulation signals applied to the modulation electrode 14 are synchronized with the scanning voltage applied to the horizontal deflection electrode 15 such that, in each horizontal scanning interval of the display picture, modulation levels for respective picture elements are applied at correct timings during horizontal scanning of the electron beams. Circuits for implementing such synchronization of modulation and scanning signals, based upon digital signal processing of a video signal are already known in the art, and a detailed description of this will therefore be omitted.

Figure 1A:
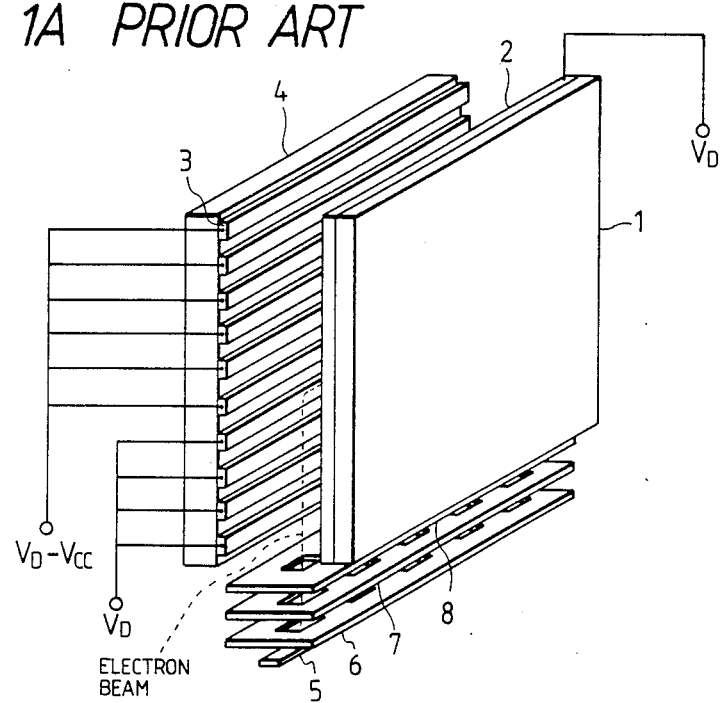
FIG. 1A is an oblique partial view showing the general configuration of an example of a prior art flat CRT display apparatus.
Figure 1B:
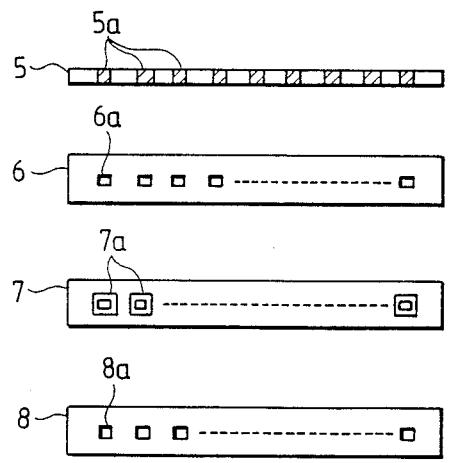
FIG. 1B illustrates components of an electron gun of the flat CRT display apparatus of FIG. 1A.
Figure 3:
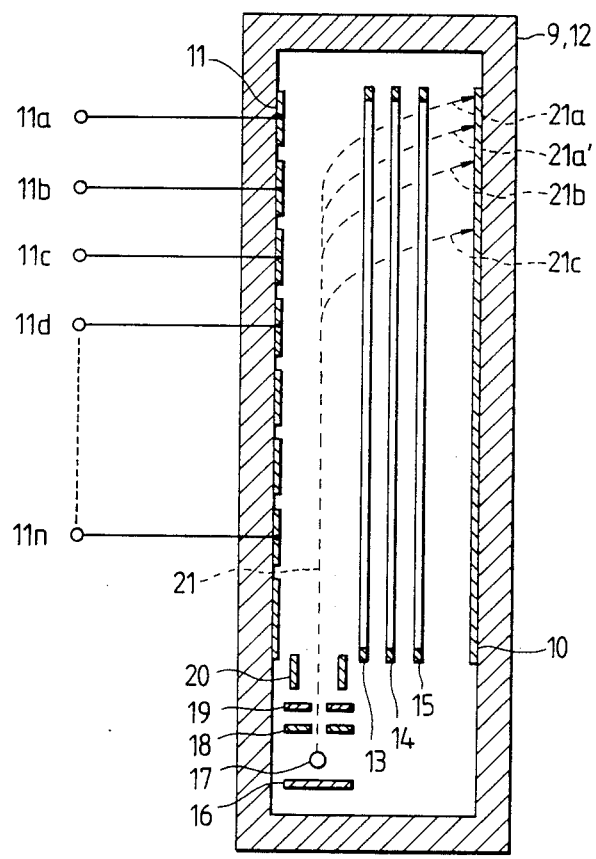
FIG. 3 is a cross-sectional view in elevation of the first embodiment.
Figure 4:
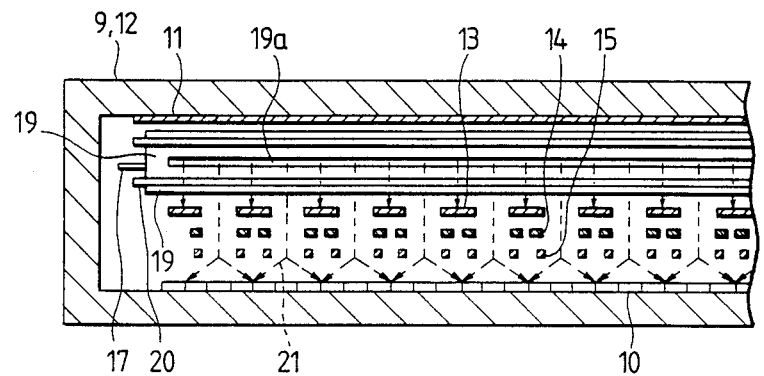
FIG. 4 is a partial cross-sectional plan view of the first embodiment.
Figure 5A:
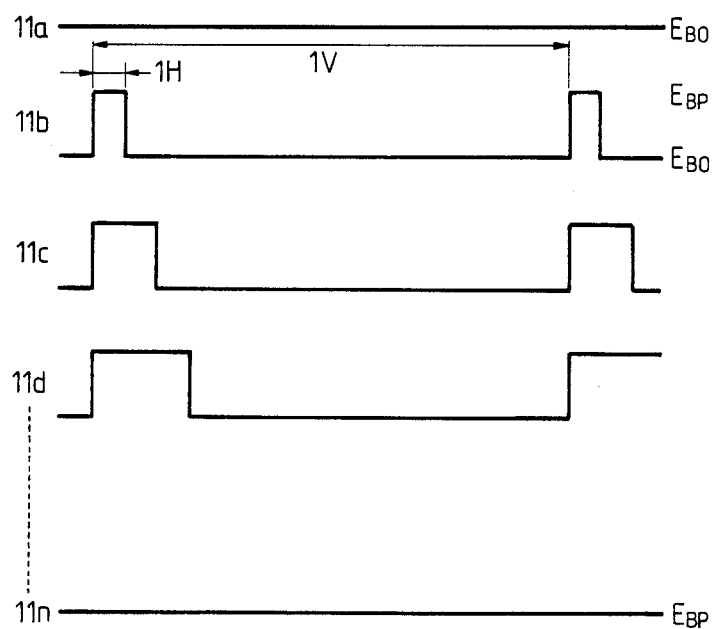
FIG. 5A is a waveform diagram for illustrating scanning voltages applied to a set of vertical scanning deflection electrodes in the first embodiment.

If the number of the vertical scanning deflection electrodes 11 is made substantially equal to the total number of horizontal scanning lines of the display picture, then scanning by the vertical scanning deflection electrodes 11 can be performed by applying the sequential drive voltages to the electrodes 11a to 11n shown in the waveform diagram of FIG. 5A. In FIG. 5A, 1 H indicates the duration of one horizontal scanning interval, while 1 V indicates on vertical scanning interval. As shown, the uppermost one of the vertical scanning deflection electrodes 11, i.e. electrode 11a, is fixedly connected to a potential $E_{BO}$, which is lower than the potential $E_{BP}$ applied to the shield electrode 13. During the first horizontal scanning interval of a field, the voltage applied to the next-lowest electrode 11b is held at the $E_{BP}$ level, and is held at the $E_{BO}$ level for the remainder of the 1 V interval. During the first two horizontal scanning intervals of a field, the next electrode 11c is held at the $E_{BP}$ level, and at the $E_{BO}$ level for the remainder of the 1 V interval, and so on successively for the remaining vertical scanning deflection electrodes 11. In this example, the lowest of the vertical scanning deflection electrodes 11, i.e. e. 11n, is fixedly connected to the $E_{BP}$ potential, and does not execute scanning, but functions in conjunction with the shield electrode 13 to contribute to directing the electron beam emitted from the focus electrode 20 into the space between the vertical scanning deflection electrodes 11 and shield electrode 13. As a result of applying successive scanning voltages to the vertical scanning deflection electrodes 11 as described above, the electron beam 21 which is emitted from the focus electrode 20 is successively deflected into sequentially lower trajectories as illustrated by 21a, 21b, 21c in FIG. 3, remaining at each trajectory during one horizontal scanning interval.

It is however possible to apply scanning voltages to the vertical scanning deflection electrodes 11 such that each of the vertical scanning deflection electrodes 11 is utilized for sequentially positioning the row of electron beams on the screen at each of a plurality of successive horizontal scanning lines. This will be illustrated for the case in which each of the vertical scanning deflection electrodes 11 controls positioning of two horizontal scanning lines of a field, referring to the waveform diagram of FIG. 5B. In this case the scanning voltage applied to the uppermost electrode 11a of the vertical scanning deflection electrodes 11 is held at the $E_{BO}$ level during the first 1 H interval of a 1 V interval, and during this 1 H interval the uppermost horizontal scanning line of a of a field is displayed. During the succeeding 1 H interval, the electrode 11a is subjected to a potential $E_{BQ}$ which is slightly more negative than $E_{BO}$, so that the trajectory of the electron beams is modified (e.g. from the trajectory 21a to the trajectory 21a' shown in FIG. 3) such that the landing positions of the row of electron beams on the photo-emissive layer 10 is slightly lowered. As a result, a horizontal scanning line is displayed, as the second line of the field, which is positioned immediately below the first-mentioned horizontal scanning line. The scanning voltage applied to the next-lowest electrode 11b is held at the $E_{BP}$ level during the first two horizontal scanning intervals of the 1 V interval, is set to the $E_{BO}$ level during the next 1 H interval, and to the $E_{BQ}$ level during the succeeding 1 H interval. In this way, the third and fourth lines of the field can be successively displayed during these two 1 H intervals. Similar sequences of scanning voltage are successively applied to the remaining vertical scanning deflection electrodes 11.

It should be noted that although each of the scanning voltages applied to the vertical scanning deflection electrodes 11 is shown as returning to the $E_{BO}$ level when the next-lower one of the vertical scanning deflection electrodes 11 begins to be driven by the $E_{BO}$ potential, this is not essential.

Figure 5B:
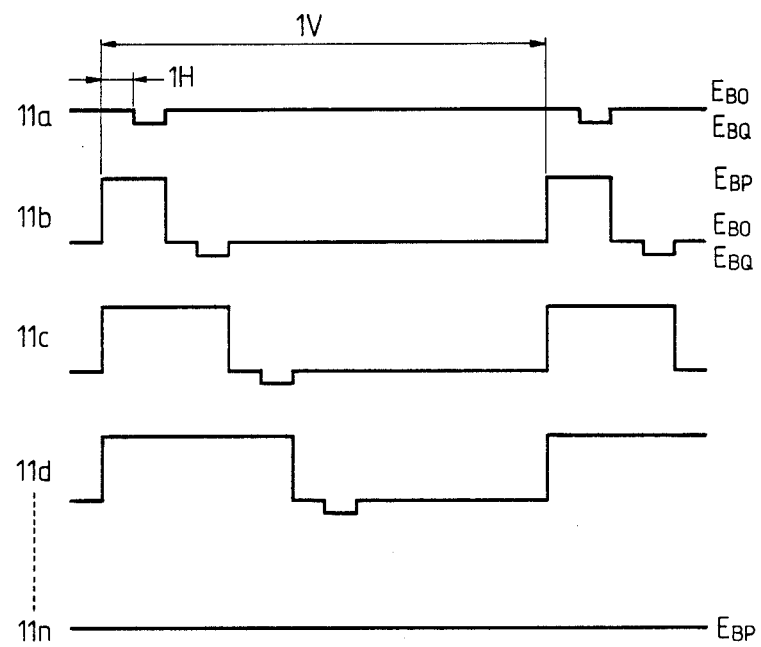
FIG. 5B is a waveform diagram of modified scanning voltages applied to the vertical scanning deflection electrodes in the first embodiment, whereby a plurality of scanning line positions are controlled by each vertical scanning deflection electrode.
Figure 6:
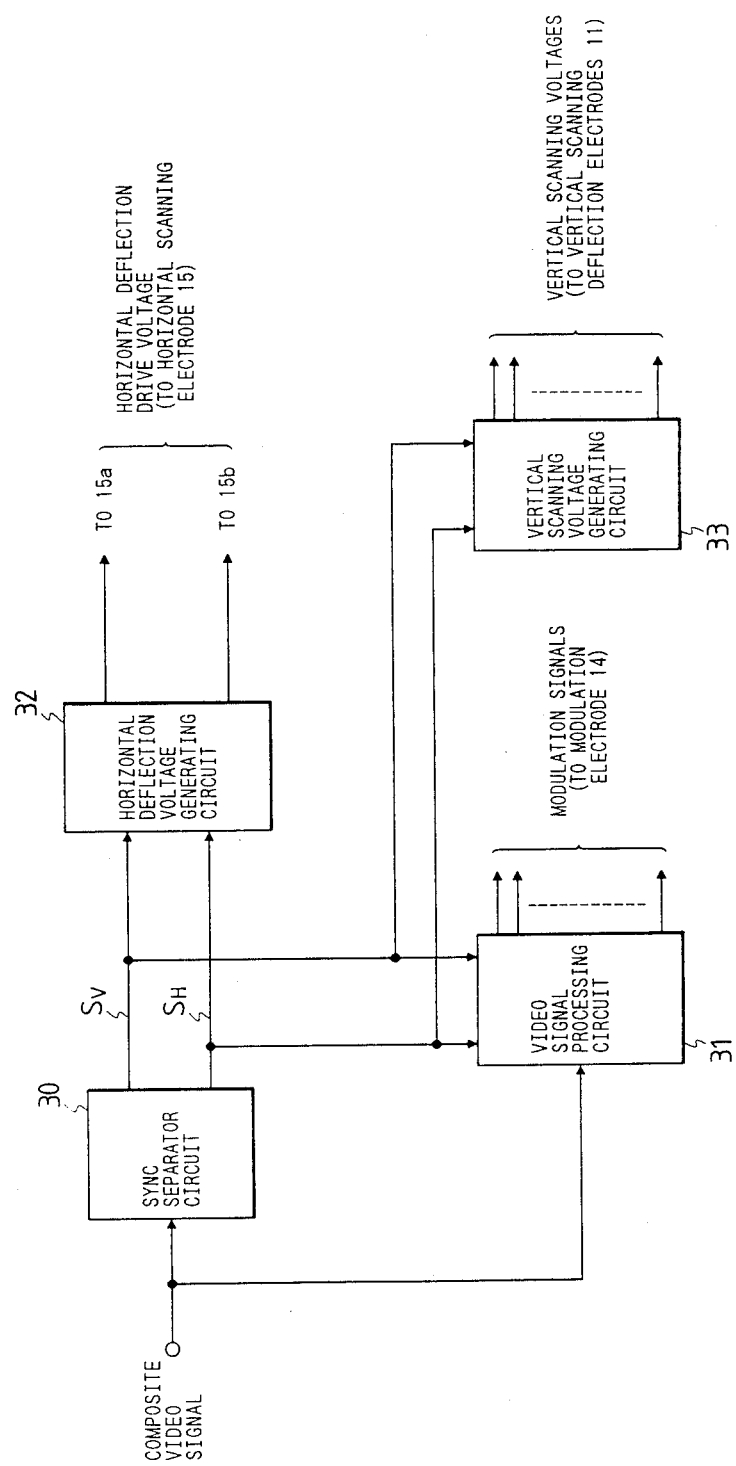
FIG. 6 is a general block diagram of circuits for generating drive signals and scanning voltages for the first embodiment.

In the example of FIG. 5B, the scanning voltage waveforms applied to the vertical scanning deflection electrodes 11 are varied such that the number of the vertical scanning deflection electrodes 11 is equal to ½ the number of horizontal scanning lines of a field of the display picture. Thus, the number of of the vertical scanning deflection electrodes 11 can be halved, and their requisite width and pitch can be increased, thereby easing manufacture of such a CRT. In general, such modification of the trajectory of the electron beam 21 by sequentially varying the level of scanning voltage applied to each vertical scanning deflection electrodes 11 could be utilized such that the number of the vertical scanning deflection electrodes 11 need only be 1/n times the total number of horizontal scanning lines of the display picture, where n is an integer.

Generally, each frame of a television picture consists of two successive interlaced fields. A second example of scanning drive voltages for the vertical scanning deflection electrodes 11 of the first embodiment will now be described, whereby frame interlace operation can be implemented by utilizing each of the vertical scanning deflection electrodes 11 to for vertical deflection between two adjacent horizontal scanning lines, referring to FIG. 5C. In this case, during a first field interval (i.e. vertical scanning interval 1 V), the $E_{BO}$ potential described above is fixedly applied to the uppermost electrode 11a of the vertical scanning deflection electrodes 11, while during the succeeding field interval the lower potential $E_{BQ}$ is applied to electrode 11a. During the first 1 H interval of the first field, the $E_{BP}$ potential is applied to the 11b electrode of the vertical scanning deflection electrodes 11, and the $E_{BO}$ potential during the remainder of that field interval. During the first 1 H interval of the next field interval, the $E_{BP}$ potential is applied to electrode 11b, and the $E_{BQ}$ potential is applied thereto during the remainder of that field. Similarly, the $E_{BP}$ potential is applied to electrode 11c during the first two 1 H intervals of the first field, then the $E_{BO}$ potential, and so on. It can thus be understood that during the first interlace field of a frame each of the beam trajectories will be for example as indicated by 21a, 21b, 21c, ... in FIG. 3, while during the second field of the frame these trajectories will be lowered, e.g. to the position 21a'. In this way, frame interlace operation of two fields per frame is achieved, although the number of the vertical scanning deflection electrodes 11 is substantially equal to the number of horizontal scanning lines in one field.

It is also possible to change the trajectory of the electron beam 21 by applying a voltage difference between the the opposing sections of the focus electrode 20, to thereby move the electron beam 21 in a direction perpendicular to the photo-emissive layer 10. It will be apparent from FIG. 3 that such a position shift of the electron beam will result in a raising or lowering of the landing positions on the photo-emissive layer 10 of the row of electron beams emitted from the horizontal deflection electrode 15. This is due to the fact that the electron beam 21 is not in fact deflected in a direction which is precisely perpendicular to the photo-emissive layer 10 by the action of the vertical scanning deflection electrodes 11, but instead attains an upwardly-sloping trajectory. It can thus be understood that beam position modification to execute interlace scanning or to utilize each of the vertical scanning deflection electrodes 11 to position two successive display lines as described above, can also be performed by periodically varying a level of voltage difference applied between the two sections of the focus electrode 20. It has been found that similar results can be obtained by this method to those obtained with the scanning voltage modification method of FIG. 5B.

FIG. 15 is a block diagram showing the general configuration of circuits for producing modulation signals and, vertical scanning voltages and horizontal deflection voltages for the first embodiment described above, for the case in which the embodiment is utilized to display a television picture based on a composite video signal. The composite video signal is applied to a sync separator circuit 30, which derives horizontal and vertical synchronizing signals $S_V$ and $S_H$. The composite video signal is also applied, together with the $S_V$ and $S_H$ signals, to a video signal processing circuit 31. The video signal processing circuit 31 contains circuits for converting the composite video signal to digital signal form, and for thereby producing modulation signals to be supplied to the respective sections of the modulation electrode 14, to modulate respective electron beams. These modulation signals are synchronized by the $S_V$ and $S_H$ signals such that at the start of each horizontal scanning interval, a modulation signal level for the first picture element of the line portion to be scanned by the leftmost one of the electron beams is produced from the video signal processing circuit 31, in parallel with a modulation signal level for the first picture element of the second line portion, which is scanned by the next one of the electron beams, and so on, i.e., then a modulation signal level for the second picture element of the first line portion, the second picture element of the second line portion, and so on, are outputted in parallel from the video signal processing circuit 31. In this way, modulation signal data are produced from the video signal processing circuit 31 at appropriate timings during each vertical and horizontal scanning interval for each of the sections of the modulation electrode 14. Circuits for implementing the functions of the video signal processing circuit 31 are now well known in the art, and detailed description will therefore be omitted.

The horizontal deflection voltage generating circuit 32 is also synchronized by the $S_V$ and $S_H$ signals from the sync separator circuit 30, to produce a horizontal deflection drive voltage to implement a horizontal sweep by each of the electron beams in common, for the duration of each horizontal scanning interval.

Vertical scanning voltages, having respective waveforms as illustrated for example in FIGS. 5A, 5B or 5C, are generated by a vertical scanning voltage generating circuit 33, these scanning voltages being generated in synchronism with the modulation signals and the horizontal deflection drive voltages by means of the synchronizing signals $S_V$ and $S_H$ from the sync separator circuit 30.

It should be noted that various modifications to the embodiment described above could be envisaged. For example, although the shield electrode 13, modulation electrode 14, and horizontal deflection electrode 15 of the embodiment have been described as each having a thin flat configuration, each substantially positioned in a single vertical plane, it would also be possible to form each of these electrodes as a plurality of flat elements which are successively positioned along a direction perpendicular to the photo-emissive layer 10. In addition, although it is assumed in the above that each of these electrodes is formed from flat metal plate, it has been found that these can equally be formed by depositing metallic film patterns upon glass plate members. Thus the vertically extending "teeth" of the two comb-shaped sections of the horizontal deflection electrode 15 can be formed simply as an array of vertically elongated film portions formed on a glass plate, with these being appropriately interconnected by connecting lead portions, and with vertical elongated apertures being formed in the glass plate between these elongated metallic film portions, to allow passage of the electron beams. A more rigid and easily manufactured structure can thereby be achieved. In addition, the "teeth" portions of the comb-shaped sections of the horizontal deflection electrode 15 can have a triangular rather than an elongated rectangular shape.

A second embodiment of a flat CRT display apparatus according to the present invention will now be described, referring first to FIGS. 7A, 7B and 8. FIG. 7A shows an oblique partial view of the apparatus. This is basically similar to the first embodiment of FIG. 2A described above, but differs in further including a vertical deflection electrode 22, which is disposed between the horizontal deflection electrode 15 and the photo-emissive layer 10 as shown. As illustrated in the plan view of FIG. 7B, the vertical deflection electrode 22 is formed of two intermeshed comb-shaped sections, as for the horizontal deflection electrode 15, with these intermeshing sections defining a plurality of horizontally elongated regions within which an electric field is produced by deflection voltages applied between the two sections. The electron beams, after passing through the horizontal deflection electrode 15, pass through these elongated regions defined by the vertical deflection electrode 22, to execute vertical deflection. The central axes of these elongated regions are indicated by the horizontal chain lines in the plan view of the vertical deflection electrode 22, and it can be understood that in the absence of any scanning voltages applied to the horizontal deflection electrode 15 and the vertical deflection electrode 22, the electron beams will pass through a row of points which are defined by the intersections of the vertical axes of the elongated regions defined by the horizontal deflection electrode 15 with one the horizontal axes of one of the elongated regions defined by the vertical deflection electrode 22.

The structure of the electron gun 23 of this embodiment is identical to that of the first embodiment described above, and further description will be omitted.

Due to the capability for vertical deflection of the electron beams by the vertical deflection electrode 22, this second embodiment enables each of the vertical scanning deflection electrodes 11 to be utilized for vertical scanning of a plurality of horizontal scanning lines of the display picture, without requiring modification of the scanning voltage waveforms applied to the vertical scanning deflection electrodes 11 as described hereinabove referring to FIGS. 5B and 5C. This operation will be described referring to the cross-sectional view in elevation of FIG. 8, the waveform diagram of FIG. 9A which shows scanning voltages sequentially applied to the vertical scanning deflection electrodes 11, and the waveform diagram of FIG. 9B which shows a scanning voltage applied between the two sections of the vertical deflection electrode 22, for the case in which each of the vertical scanning deflection electrodes 11 corresponds to three horizontal scanning lines of the display. A potential $E_{BO}$, which is substantially more negative than the potential $E_{BP}$ applied to the shield electrode 13, is continuously applied to the uppermost electrode 11. The potential $E_{BP}$ is applied to the next-lower electrode 11b of the vertical scanning deflection electrodes 11 during the first horizontal scanning interval of each field interval 1 V, and the $E_{BO}$ potential is applied for the remainder of that 1 V interval. Similarly, the $E_{BP}$ potential is applied for successively longer durations at the start of a f that 1 V interval. Similarly, the $E_{BP}$ potential is applied for successively longer durations at the start of a field interval, to the remaining successively lower-positioned ones of the vertical scanning deflection electrodes 11. Thus, referring to the cross-sectional view of FIG. 8, the electron beam 21 which emerges from the focus electrode 20 is deflected to the trajectory 21a for the duration of the first three horizontal scanning intervals of a field, due to the $E_{BO}$ potential which is applied to electrode 11a of the vertical scanning deflection electrodes 11. During the first of these horizontal scanning intervals, each of the electron beams thus emitted from the horizontal deflection electrode 15 is deflected to the trajectory 21aa by an electric field produced within the uppermost of the aforementioned elongated regions defined by the vertical deflection electrode 22, this electric field resulting from a potential $+E_{SA}$ which is applied between the two sections of the vertical deflection electrode 22. During the second horizontal scanning interval, the potential applied between the two sections of the vertical deflection electrode 22 is held at zero, so that the electron beams are not deflected by the vertical deflection electrode 22, and so take the trajectory 21ab. During the third horizontal scanning interval of the field, the potential applied between the two sections of the vertical deflection electrode 22 is held at a value of $-E_{SA}$. The electron beams are thereby deflected to the trajectory 21ac in FIG. 8. During the succeeding three horizontal scanning intervals, a similar deflection sequence is applied, with the electron beam produced from the focus electrode 20 having been first deflected to the trajectory 21b by the potential applied to the second electrode 11b of the vertical scanning deflection electrodes 11.

In this way, the number of the vertical scanning deflection electrodes 11 need only be ⅓ of the total number of horizontal scanning lines of the display picture. In general, this vertical deflection operation using the vertical deflection electrode 22 can be applied such that the number of the vertical scanning deflection electrodes 11 is 1/m times the total number of horizontal scanning lines of the display picture, where m is an integer.

The above vertical deflection control by means of the vertical deflection electrode 22 can of course also be used to implement field interlace operation, in the case of an interlace display. This could be done, for example, by utilizing the deflection trajectories 21aa, 21ba, 21ca, etc during a first field of a frame, then utilizing the trajectories 21ab, 21bb, 21cb, etc during the second field. In that case, the number of the vertical scanning deflection electrodes 11 would be ½ of the total number of horizontal scanning lines, and the $E_{BP}$ potential shown in FIG. 9B would be applied to the electrode 11b during two horizontal scanning intervals at the start of a field, to the electrode 11c during four horizontal scanning intervals at the start of the field, and so on.

Figure 8:
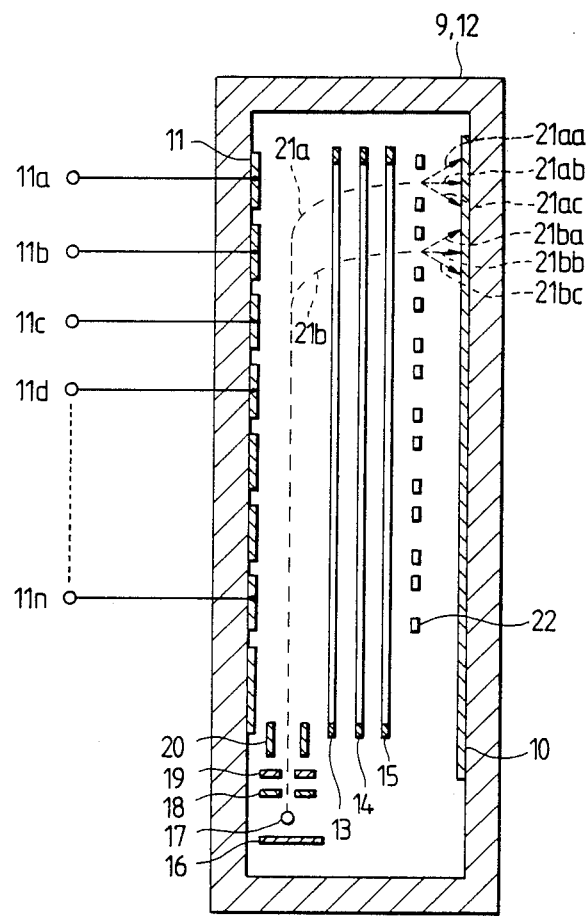
FIG. 8 is a cross-sectional view in elevation of the second embodiment.

It can be understood from the above that in general the potential $E_{BP}$ shown in FIG. 8 is applied to electrode 11b for m horizontal scanning intervals in each field, to the electrode 11c for 2 m horizontal scanning intervals in each field, to the electrode 11d for 3 m horizontal scanning intervals, and so on, where m is the integer defined hereinabove. The levels of the deflection voltage sequentially applied to the vertical deflection electrode 22 must of course be determined in accordance with the number of different trajectories which are to be established by the vertical deflection electrode 22 (this number being 3, in the above example).

Figure 10A:
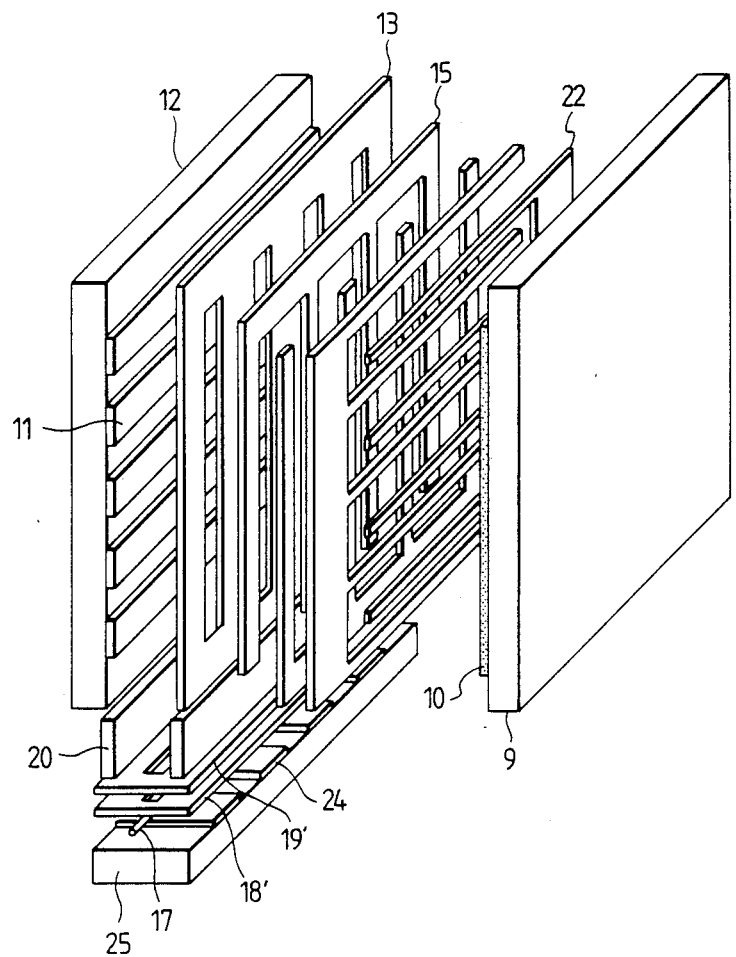
FIG. 10A is an oblique partial view showing the general configuration of a third embodiment of a flat CRT display apparatus according to the present invention.
Figure 10B:
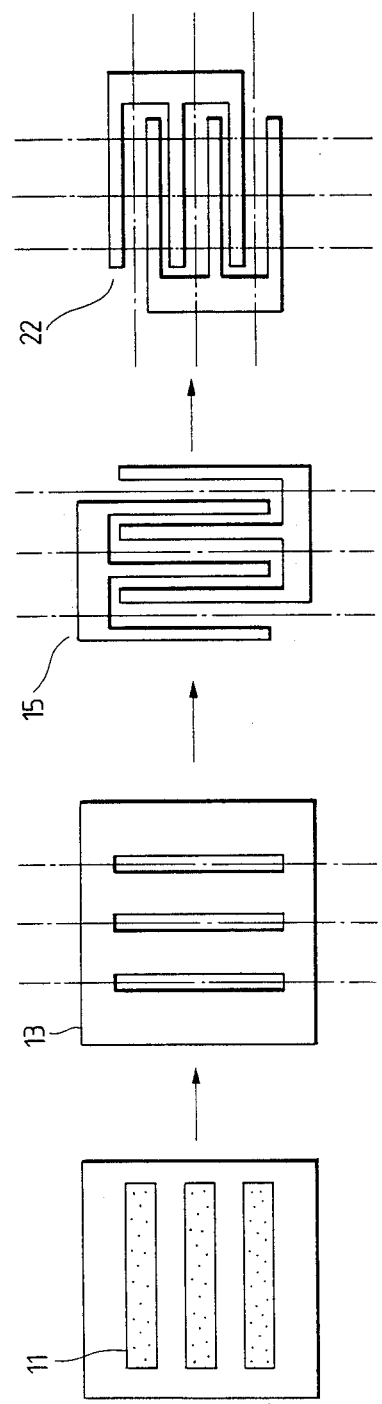
FIG. 10B shows respective views in elevation of vertically oriented focusing and deflection electrodes in the third embodiment.

In the embodiments described above, electron beam modulation is executed by a modulation electrode 14, which is of basically flat form, aligned parallel and close to the photo-emissive layer 10. However the invention is not limited to such a method of modulation, as will be described with reference to a third embodiment of a flat CRT display apparatus, shown in partial oblique view in FIG. 10A. With the first two embodiments described above, a single thin sheet electron beam is produced from the electron gun 23, which is subsequently converted to a row of thin line electron beams by the electrodes 13, etc, after deflection by the action of the vertical scanning deflection electrodes 11, with this row of beams then being modulated. However with the third embodiment, a row of thin line electron beams is produced and also modulated by the electron gun, which includes an array of modulation electrodes. In this embodiment, a shield electrode 13 and a horizontal deflection electrode 15 are disposed in the space between the vertical scanning deflection electrodes 11 and photo-emissive layer 10, together with a vertical deflection electrode 22, whose general configurations are illustrated in FIG. 10B. However it will be apparent that the embodiment could be modified by omitting the vertical deflection electrode 22, with vertical deflection control being executed as described for the first embodiment hereinabove.

Figure 12:
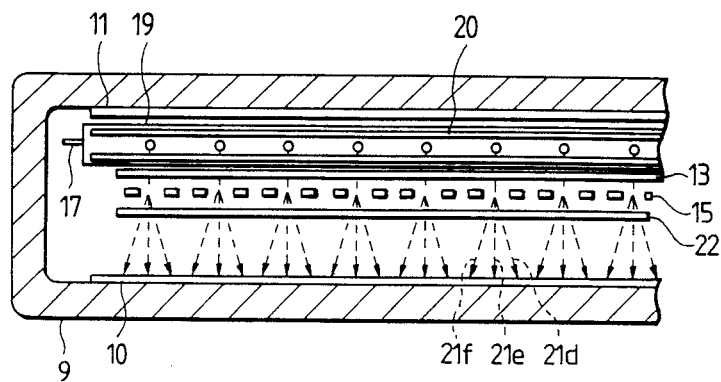
FIG. 12 is a partial cross-sectional view in plan of the third embodiment.

The components of the electron gun of this embodiment are separately shown in plan views in FIG. 10c. A modulation electrode 24 is formed of a set of electrode sections 24a, 24b, . . . consisting of respective electrically conductive layer portions which are formed upon a flat portion 25 of the outer envelope of the CRT, this envelope consisting of of an electrically insulating material such as glass, these electrode sections being spaced apart with a fixed pitch. The number of these layer portions of the modulation electrode 24 is identical to the number of electron beams emitted from the electron gun. The modulation electrode 24 is positioned below and closely adjacent to the line cathode 17, which is identical to that of the first two embodiments described above. A G1 electrode 18', a G2 electrode 19' and a focus electrode 20 are successively positioned above the line cathode 17, and perform similar functions to the electrodes 18, 19 and 20 of the first two embodiments. However in addition, as shown in FIG. 10C, the G1 electrode 18' and the G2 electrode 19' are each provided with a line array of small apertures, rather than a single elongated aperture as in the first two embodiments. These small apertures extend horizontally, parallel to the photo-emissive layer 10, at regular intervals with a pitch which is identical to that of the sections 24a, 24b, . . . of the modulation electrode 24. A set of thin line electron beams is thereby emitted from the focus electrode 20, this set extending along the horizontal direction of the display and with each of the beams being vertically oriented and each being modulated in intensity in accordance with a level of modulation voltage applied to a corresponding one of the electrode sections of the modulation electrode 24. The pitch of the apertures in the G1 electrode 18' and the G2 electrode 19' is identical to that of the elongated apertures formed in the shield electrode 13 and the elongated regions defined by the horizontal deflection electrode 15, so that as illustrated in the cross-sectional view in elevation of FIG. 11 and the partial cross-sectional view in plan of FIG. 12, after deflection by the vertical scanning deflection electrodes 11 in the same way as described hereinabove for the case of a single flat sheet electron beam, the electron beams emitted through the aforementioned apertures of the electron gun electrodes then pass through these apertures and regions of the shield electrode 13 and horizontal deflection electrode 15, and are horizontally and vertically deflected by electric field produced by the horizontal deflection electrode 15 and the vertical deflection electrode 22 in a similar manner to that described above for the second embodiment.

It can thus be understood that in all respects other than the manner of generating and modulating the row of electron beams which are directed onto the photo-emissive layer 10, the operation of this third embodiment is essentially similar to that of the second embodiment described above.

It should be noted that this embodiment is not limited to the form of modulation electrode described. For example, a modulation electrode could be disposed within the electron gun for modulating the electron beams after they have been emitted. This electrode could consists of a set of mutually electrically isolated sections each having an aperture to allow passage of a corresponding electron beam. Alternatively, an electrode which is used to form the beams, such as the G1 electrode 18' could be formed as a set of mutually electrically isolated sections with respective apertures, and used in common for both modulation and beam shaping.

It should also be noted that the present invention is not limited to the use of a line cathode of the form utilized in the above embodiments. It is conceivable that one or more cathodes of the form utilized in a conventional CRT could be adapted as an electron source for a flat CRT display apparatus according to the present invention, for example.

Furthermore, although in the second and third embodiments described above the vertical deflection electrode 22 is positioned between the horizontal deflection electrode 15 and the photo-emissive layer 10, it would be equally possible to position the electrode 22 between the horizontal deflection electrode 15 and the shield electrode 13.

It would also be possible to position the electron gun along the upper part of the apparatus, rather than along the lower part as in the described embodiments. This would of course require appropriate modification of the scanning voltage waveforms applied to the vertical scanning deflection electrodes 11.

From the above description it can be understood that with the first embodiment, control of the landing positions of the electron beams on the photo-emissive layer of the screen, in the horizontal direction, is controlled by a set of electrodes 13 to 15 positioned closely adjacent to that screen layer, and in particular by the horizontal deflection electrode 15. Thus, much more precise position control of the beams can be achieved than is possible with the prior art apparatus of FIG. 1, making it practicable to apply such a display apparatus to color television display. Furthermore with the second and third embodiments, control of the landing positions with respect to the vertical direction is performed by the vertical deflection electrode 22, which also is positioned closely adjacent to the photo-emissive layer of the screen. Since the distance which each electron beam travels after exiting from each of these deflection electrodes to the screen is extremely small, highly accurate position control can be achieved of the respective light spots which are formed by the beams, so that it becomes possible to utilize such a display apparatus to produce a picture of much higher resolution than has been possible hitherto, with uniform spot size over the entire display area and (in the case of a color display) with freedom from display color deviations which can result from errors in spot position or spot size.

Figure 13:
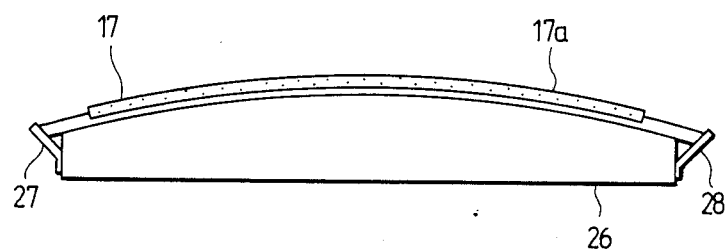
FIGS. 13 and 14 are views in elevation of respective embodiments of a line cathode supporting structure, for a flat CRT display apparatus according to the present invention.

In the embodiments described above, the line cathode 17 is supported by retaining elements (not shown in the drawings) which include at least one spring for retaining the line cathode 17 in a state of tension. However with such a structure, the line cathode 17 is extremely susceptible to the effects of any mechanical vibration applied to the display apparatus. Resultant vibration of the line cathode 17 can result in various types of disturbance in the display picture, and color deviations in a color display, due to position deviations of the electron beams. FIG. 13 is a view in elevation of a supporting structure for the line cathode 17, which has the objective of substantially overcoming this problem of vibration of a line cathode. Numeral 26 denotes a supporting member, preferably formed of an electrically insulating ceramic material such as alumina, and has an upper surface having a contour in the shape of an arc of a circle. An attachment member 27 which is fixedly attached to the cathode supporting member 26 and to the line cathode 17, and a spring 28 which is also fixedly attached to the cathode supporting member 26 and line cathode 17, are positioned at opposite ends of the cathode supporting member 26, such as to retain the line cathode 17 in a state of tension, stretched over and in contact with the arc-contour surface of the cathode supporting member 26.

The arc-contour surface of the cathode supporting member 26 can be formed by grinding machining. Each of the attachment member 27 and spring 28 is preferably formed of metal, and these are respectively attached by screws or an adhesive agent such as low melting-point glass to the cathode supporting member 26. The line cathode 17 is formed of tungsten wire having a diameter of 10 to 13 micronmeters, which is coated along a part of its length with a layer 17a of an electron-emissive oxide material (generally referred to as a cathode oxide).

It has been found that such a structure can substantially eliminate the problems of vibration of the line cathode 17 described above.

Preferably, the layer of cathode oxide is formed only over an upper region of the line cathode 17, such that the part of the line cathode 17 which is held in contact with the surface of the cathode supporting member 26 is left uncoated by the cathode oxide. This has been found to effectively prevent the cathode oxide from flaking off from the line cathode 17.

Figure 14:
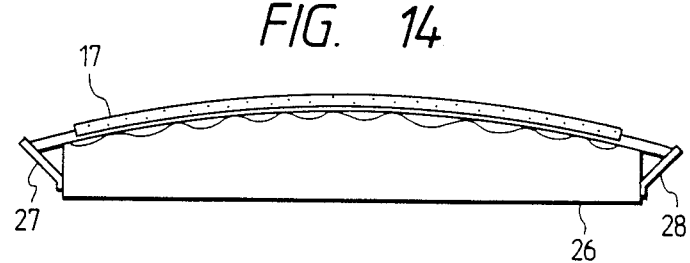

FIG. 14 shows a second embodiment of a supporting structure for the line cathode 17. Here, the line cathode 17 is supported on a cathode supporting member 26 as in the example of FIG. 13, with the the line cathode 17 being retained in contact with the surface of the cathode supporting member 26 having a basically arc-contour shape. However in this embodiment, this arc-contour surface is further machined (e.g. by grinding using a grinding material formed of fine abrasive particles, preferably 500 mesh or less), such as to form small-amplitude convex and concave undulations on this arc-contour face. Grinding to form these undulations is preferably executed after the face has been machined to the contour of an arc of a circle, and finished to a high degree of polish.

An alternative method of forming these undulations on the arc-contour surface is to execute selective hot etching of portions of that surface after it has been machined to a mirror finish. Alternatively, it is possible to simply form scratches in the machined surface of the arc-contour face, by mechanical machining (e.g. using a dicing tool).

The line cathode 17 is supported in the same manner as the embodiment of FIG. 13, such as to be held in a state of tension, in contact with the arc-contour surface having these surface undulations formed therein.

The embodiment of FIG. 14 has the advantage that the area of contact between the line cathode 17 and the cathode supporting member 26 can be reduced, by comparison with the embodiment of FIG. 13, so that heat loss from the line cathode 17 to the cathode supporting member 26 is reduced.

The embodiments of FIGS. 13 and 14 have been described for the case in which the line cathode 17 is in direct contact with the cathode supporting member 26. However in order to prevent an accumulation of electric charge on the surface of the cathode supporting member 26, it is preferable to form a thin film of electrically conducting material (not shown in the drawings) over the surface of the cathode supporting member 26 which is contacted by the line cathode 17, i.e. so that the line cathode 17 comes into contact with this conductive surface film. Alternatively, such a film of electrically conductive material can be formed over a region of the arc-contour surface of the cathode supporting member 26 which is close to a surface region that is directly contacted by the cathode supporting member 26, without the conducting film being directly contacted by the line cathode 17.

Although the embodiments of FIGS. 13 and 14 have been described for the case in which the cathode supporting member 26 is formed of an electrically insulating material, this is not essential. It is possible to form the cathode supporting member 26 from a metal, shaped as described above, and to then form a film of electrically insulating material (such as alumina) over a surface region of the cathode supporting member 26 that is contacted by the line cathode 17. This surface film can be formed by a method such as vacuum evaporative deposition, chemical vapor deposition, etc.

What is claimed is:

1. A flat cathode ray tube display apparatus for producing a display picture, comprising:
   an evacuated envelope having flat mutually opposing first and second portions, with at least said first envelope portion being optically transparent and having a photo-emissive layer of a fluorescent material formed over a rectangular region of an inner surface of said first envelope portion, said rectangular region having respective sides thereof extending in a horizontal and a vertical direction of said display picture;
   a set of vertical scanning deflection electrodes formed as elongated conductive strips respectively extending in said horizontal direction, arrayed with a fixed pitch along said vertical direction upon an inner surface of said second envelope portion;
   an electron gun comprising a line cathode extending in said horizontal direction disposed within said envelope, extending between said first and second envelope portions, for emitting an electron beam into a region between said vertical scanning deflection electrodes and photo-emissive layer and for forming said electron beam as a thin flat sheet aligned substantially parallel to said photo-emissive layer;
   means for applying scanning voltages to said vertical scanning deflection electrodes for producing deflection of said electron beam towards said photo-emissive layer by successive ones of said vertical scanning deflection electrodes;
   shield electrode means disposed between said vertical scanning deflection electrodes and photo-emissive layer, for converting said thin sheet electron beam to a corresponding plurality of thin line electron beams directed towards said photo-emissive layer, subsequent to deflection by said vertical scanning deflection electrodes;
   a plurality of modulation electrodes arrayed with a fixed pitch along said horizontal direction for modulating respective ones of said plurality of electron beams; and
   horizontal deflection electrode means for periodically deflecting said plurality of electron beams together in said horizontal direction, following modulation by said modulation electrodes.

2. A display apparatus according to claim 1, and further comprising vertical deflection electron means for deflecting said plurality of electrode beams in said vertical direction.

3. A display apparatus according to claim 1, in which said shield electrode means comprises a shield electrode of flat shape which is disposed parallel to said photo-emissive layer between said modulation electrodes and said vertical scanning deflection electrodes, having a plurality of apertures formed therein for shaping respective ones of said plurality of electron beams, said apertures being spaced apart with a fixed pitch and respectively elongated in said vertical direction.

4. A display apparatus according to claim 3, in which said modulation electrodes means comprise a plurality of mutually electrically isolated electrode sections provided with apertures elongated in said vertical direction and positioned to permit passage of respective ones of said plurality of electron beams produced from said shield electrode means.

5. A display apparatus according to claim 1, in which said horizontal deflection electrode means comprises an opposed pair of horizontal deflection electrode members shaped to define a plurality of elongated regions each extending in said vertical direction and respectively positioned in correspondence with to said elongated apertures of the shield electrode, and means for applying a periodically varying horizontal deflection voltage between said electrode members.

6. A display apparatus according to claim 2, in which said horizontal deflection electrode means comprises an opposed pair of horizontal deflection electrode members shaped to define a plurality of elongated regions each extending in said vertical direction and respectively positioned in correspondence with said elongated apertures of the shield electrode, and means for applying a periodically varying horizontal deflection voltage between said electrode members, and in which said vertical deflection electrode means comprise an opposed pair of vertical deflection electrode members shaped to define a plurality of elongated regions each extending in said horizontal direction and respectively positioned to receive said plurality of electron beams at successive positions along said vertical direction which are respectively defined by deflection operation of said vertical scanning deflection electrodes.

7. A display apparatus according to claim 1, in which said scanning voltages are sequentially varied in amplitude for a plurality of successive horizontal scanning intervals of a field of said display picture, to implement successive deflection of said thin sheet electron beam in each field of said picture by each of said vertical scanning deflection electrodes to a plurality of successive horizontal scanning line positions of said picture, and in which said vertical scanning deflection electrodes are made substantially equal in number to 1/n times a total number of horizontal scanning lines of said picture, where n is an integer of value greater than one.

8. A display appparatus according to claim 1, in which said modulation means are modulated in accordance with a field interlace video signal, and in which said scanninf voltages are sequentially varied in amplitude between a first field and a second field of said video signal, to implement deflection of said thin sheet electron beam by each of said vertical scanning deflection electrodes to a first trajectory during said first field and a second trajectory which is vertically displaced from said first trajectory, during said second field, to thereby implement interlace scanning operation.

9. A display apparatus according to claim 1, in which said electron gun comprises a focus electrode comprising two opposing elongated electrode sections between which is passed said thin sheet electron beam, said focus electrode having a fixed common potential applied to said electrode sections for focussing said electron beam and having a differential potential applied between said electrode sections, for position adjustment of said electron beam.

10. A display apparatus according to claim 9, in which said differential voltage is sequentially varied for a plurality of successive horizontal scanning intervals of a display picture produced by said apparatus, to implement successive deflection of said thin sheet electron beam by each of said vertical scanning deflection electrodes to a plurality of successive horizontal scanning line positions of said picture, and in which said vertical scanning deflection electrodes are made substantially equal in number to 1/n times a total number of horizontal scanning lines of said picture, where n is an integer of value greater than one.

11. A display apparatus according to claim 9, in which said modulation means are modulated in accordance with a field interlace video signal, and in which said differential voltage is sequentially varied between a first field and a second field of said video signal, to omplement deflection of said thin sheet electron beam by each of said vertical scanning deflection electrodes to a first trajectory during said first field and a second trajectory which is vertically displaced from said first trajectory, during said second field, to thereby implement interlace scanning operation.

12. A display apparatus according to claim 1, and further comprising a supporting member and retaining means for supporting and retaining said line cathode, said retaining means holding said line cathode in contact with a surface of said supporting member, said supporting member being formed as a rigid body, said surface being formed with a contour of convex curvature which is substantially an arc of a circle and said line cathode being retained against said surface such as to be shaped to said contour.

13. A display apparatus according to claim 12, in which said convex contour surface is further formed with undulations therein.

14. A flat cathode ray tube display apparatus for producing a display picture, comprising:
an evacuated envelope having flat mutually opposing first and second portions, with at least said first envelope portion being optically transparent and having a photo-emissive layer of a fluorescent material formed over a rectangular region of an inner surface of said first envelope portion, said rectangular region having respective sides thereof extending in a horizontal and a vertical direction of said display picture;
a set of N/n vertical scanning deflection electrodes formed as elongated conductive strips respectively extending in said horizontal direction, arrayed with a fixed pitch along said vertical direction upon an inner surface of said second envelope portion, where N is a total number of scanning lines of said display picture and n is a fixed integer of value greater than one;
an electron gun disposed with said envelope, extending between said first and second envelope portions for emitting a plurality of electron beams, each of thin linear shape, into a region between said vertical scanning deflection electrodes and photo-emissive layer, said electron beams being each aligned in said vertical direction and successively arrayed along said horizontal direction with a fixed pitch;
means for applying scanning voltage to said vertical scanning deflection electrodes for producing a common deflection of said electron beams towards said photo-emissive layer by successive ones of said vertical scanning deflection electrodes;
modulation electrode means for modulating respective ones of said plurality of electron beams; and
horizontal deflection electrode means and vertical deflection electrode means respectively positioned between said modulation electrode means and said photo-emissive layer, for periodically deflecting said plurality of electron beams together to sweep said electron beams across said photo-emissive layer, following deflection by said vertical scanning deflection electrodes.

15. A display apparatus according to claim 14, and further comprising a shield electrode of flat shape which is disposed parallel to said photo-emissive layer between said horizontal and vertical deflection electrode means and said vertical scanning delection electrodes, having a plurality of apertures formed therein which are respectively elongated in said vertical direction and spaced apart with a fixed pitch, for allowing passage of respective ones of said electron beams.

16. A display apparatus according to claim 14, in which said electron gun includes a line cathode extending in said horizontal direction, and in which said modulation electrode means comprises a plurality of mutually electrically isolated electrode sections disposed adjacent to and directly below said line cathode, at positions respectively corresponding to said electron beams.

17. A display apparatus according to claim 14, in which said horizontal deflection electrode means comprises an opposed pair of horizontal deflection electrode members shaped to define a plurality of elongated regions each extending in said vertical direction and positioned to permit passage of respective ones of said electron beams, means for applying a periodically varying horizontal deflection voltage between said electrode members, and in which said vertical deflection electrode means comprise an opposed pair of vertical deflection electrode members shaped to define a plurality of elongated regions each extending in said horizontal direction and respectively positioned to receive said plurality of electron beams at successive positions along said vertical direction which are respectively defined by deflection operation of said vertical scanning deflection electrodes, and means for applying a periodically varying vertical deflection voltage between said vertical deflection members.

18. A display apparatus according to claim 14, in which said scanning voltages are sequentially varied in amplitude for a plurality of successive horizontal scanning intervals of each field of said display picture, to implement successive deflection of said thin electron beams by each of said vertical scanning deflection electrodes to a plurality of successive horizontal scanning line positions of said picture field.

19. A display apparatus according to claim 14, in which said modulation means is modulated in accordance with a field interlace video signal, and in which said scanning voltages are sequentially varied in amplitude between a first field and a second field of a frame of said video signal, to implement common deflection of said electron beams by each of said vertical scanning deflection electrodes to a first trajectory during said first field and a second trajectory which is vertically displaced from said first trajectory, during said second field, to thereby implement interlace scanning operation.

20. A display apparatus according to claim 14, in which said electron gun comprises a focus electrode comprising two opposing elongated electrode sections between which is passed said thin electron beams, said focus electrode having a fixed common potential applied to said electrode sections for focussing said electron beams and having a differential potential applied between said electrode sections, said differential potential being varied for position adjustment of said electron beams.

21. A display apparatus according to claim 20, in which said differential potential is sequentially varied for a plurality of successive horizontal scanning intervals of a field of said display picture, to implement successive deflection of said thin electron beams by each of said vertical scanning deflection electrodes to a plurality of successive horizontal scanning line positions of said picture field.

22. A display apparatus according to claim 20, in which said modulation means is modulated in accordance with a field interlace video signal, and in which said differential voltage is sequentially varied between a first field and a second field of said video signal, to implement common deflection of said electron beams by each of said vertical scanning deflection electrodes to a first trajectory during said first field and a second trajectory which is vertically displaced from said first trajectory, during said second field, to thereby implement interlace scanning operation.

23. A display apparatus according to claim 14, and further comprising a supporting member and retaining means for supporting and retaining said line cathode, said retaining means holding said line cathode in contact with a surface of said supporting member, said supporting member being formed as a rigid body, said surface being formed with a contour of convex curvature which is substantially an arc of a circle and said line cathode being retained against said surface such as to be shaped to said contour.

24. A display apparatus according to claim 23, in which said convex contour surface is further formed with undulations therein.

25. A flat cathode ray tube display apparatus comprising:
an evacuated envelope having flat mutually opposing first and second portions, with at least said first envelope portion being optically transparent and having a photo-emissive layer of a fluorescent material formed over a rectangular region of an inner surface of said first envelope portion, said rectangular region having respective sides thereof extending in a horizontal and a vertical direction, and with a set of vertical scanning deflection electrodes formed as elongated conductive strips arrayed with a fixed pitch upon an inner surface of said second envelope portion;
an electron gun disposed within said envelope, extending between said first and second envelope portions, for emitting an electron beam into a region between said vertical scanning deflection electrodes and photo-emissive layer and for forming said electron beam as a thin flat sheet aligned substantially parallel to said photo-emissive layer;
means for applying scanning voltages to said vertical scanning deflection electrodes for producing deflection of said electron beam towards said photo-emissive layer by successive ones of said vertical scanning deflection electrodes;
shield electrode means disposed between said vertical scanning deflection electrodes and photo-emissive layer, for converting said thin sheet electron beam to a corresponding plurality of thin electron beams directed towards said photo-emissive layer, subsequent to deflection by said vertical scanning deflection electrodes;
modulation electrode means for modulating respective ones of said plurality of electron beams; and
deflection electrode means for periodically deflecting said plurality of electron beams together, following modulation by said modulation electrode means;
in which said electron gun comprises a line cathode, and further comprising a supporting member and retaining means for supporting and retaining said line cathode, said retaining means holding said line cathode in contact with a surface of said supporting member, said surface being formed with a contour of convex curvature which is substantially an arc of a circle, in which said supporting member is formed of an electrically insulating material, and further comprising a film of electrically conductive material formed over a region of said convex contour surface which is placed in contact with said line cathode.

26. A flat cathode ray tube display apparatus comprising:
an evacuated envelope having flat mutually opposing first and second portions, with at least said first envelope portion being optically transparent and having a photo-emissive layer of a fluorescent material formed over a rectangular region of an inner surface of said first envelope portion, said rectangular region having respective sides thereof extending in a horizontal and a vertical direction, and with a set of vertical scanning deflection electrodes formed as elongated conductive strips arrayed with a fixed pitch upon an inner surface of said second envelope portion;
an electron gun disposed within said envelope, extending between said first and second enevelope portions, for emitting an electron beam into a region between said vertical scanning deflection electrodes and photo-emissive layer and for forming said electron beam as a thin flat sheet aligned substantially parallel to said photo-emissive layer;
means for applying scanning voltages to said vertical scanning deflection electrodes for producing deflection of said electron beam towards said photo-emissive layer by successive ones of said vertical scanning deflection electrodes;
shield electrode means disposed between said vertical scanning deflection electrodes and photo-emissive layer, for converting said thin sheet electron beam to a corresponding plurality of thin line electron beams directed towards said phot-emissive layer, subsequent to deflection by said vertical scanning deflection electrodes;
modulation electrode means for modulating respective ones of said plurality of electron beams; and
deflection electrode means for periodically deflecting said plurality of electron beams together, following modulation by said modulation electrode means;
in which said electron gun comprises a line cathode, and further comprising a support member and retaining means for supporting and retaining said line cathode, said retaining means holding said line cathode in contact with a surface of said supporting member, said surface being formed with a contour of convex curvature which is substantially an arc of a circle, in which said supporting member is formed of an electrically insulating material, and further comprising a film of electrically conductive material formed over a region of said convex contour surface which is closely adjacent to a region of said surface that is placed in contact with said line cathode.

27. A flat cathode ray tube display apparatus comprising:
an evacuated envelope having flat mutaually opposing first and second portions, with at least said first envelope portion being optically transparent and having a photo-emissive layer of a fluorescent material formed over a rectangular region of an inner surface of said first envelope portion, said rectangular region having respective sides thereof extending in a horizontal and a vertical direction, and with a set of vertical scanning deflection electrodes formed as elongated conductive strips arrayed with a fixed pitch upon an inner surface of said second envelope portion;
an electron gun disposed within said envelope, extending between said first and second envelope portions, for emitting an electron beam into a region between said vertical scanning deflection electrodes and photo-emissive layer and for forming said electron beam as a thin flat sheet aligned substantially parallel to said photo-emissive layer;
means for applying scanning voltages to said vertical scanning deflection electrodes for producing deflection of said electron beam towards said photo-emissive layer by successive ones of said vertical scanning deflection electrodes;
shield electrode means disposed between said vertical scanning deflection electrodes and photo-emissive layer, for converting said thin sheet electron beam to a corresponding plurality of thin line electron beams directed towards said photo-emissive layer, subsequent to deflection by said vertical scanning deflection electrodes;
modulation electrode means for modulating respective ones of said plurality of electron beams; and
deflection electrode means for periodically deflecting said plurality of electron beams together, following modulation by said modulation electrode means;
in which said electron gun comprises a line cathode, and further comprising a supporting member and retaining means for supporting and retaining said line cathode, said retaining means holding said line cathode in contact with a surface of said supporting member, said surface being formed with a contour of convex curvature which is substantially an arc of a circle, in which said supporting member is formed of a metal, and further comprising a layer of an electrically insulating material formed over a region of said convex contour surface which is placed in contact with said line cathode.

28. A flat cathode ray tube display apparatus comprising:
an evacuated envelope having flat mutually opposing first and second portions, with at least said first envelope portion being optically transparent and having a photo-emissive layer of a fluorescent material formed over a rectangular region of an inner surface of said first envelope portion, said rectangular region having respective sides thereof extending in a horizontal and a vertical direction, and with a set of vertical scanning deflection electrodes formed as elongated conductive strips arrayed with a fixed pitch upon an inner surface of said second envelope portion;
an electron gun disposed within said envelope, extending between said first and second envelope portions, for emitting an electron beam into a region between said vertical scanning deflection electrodes and photo-emissive layer and for forming said electron beam as a thin flat sheet aligned substantially parallel to said photo-emissive layer;
means for applying scanning voltages to said vertical scanning deflection electrodes for producing deflection of said electron beam towards said photo-emissive layer by successive ones of said vertical scanning deflection electrodes;
shield electode means disposed between said vertical scanning deflection electrodes and photo-emissive layer, for converting said thin sheet electron beam to a corresponding plurality of thin line electron beams directed towards said photo-emissive layer, subsequent to deflection by said vertical scanning deflection electrodes;
modulation electrode means for modulating respective ones of said plurality of electron beams; and
deflection electrode means for periodically deflecting said plurality of electron beams together, following modulation by said modulation electrode means;
in which said electron gun comprises a line cathode, and further comprising a supporting member and retaining means for supporting and retaining said line cathode, said retaining means holding said line cathode in contact with a surface of said supporting member, said surface being formed with a contour of convex curvature which is substantially an arc of a circle, in which said line cathode comprises a length of metal wire having a surface layer of a cathode oxide material formed thereon, and in which said cathode oxide layer is restricted to a region of said line cathode which does not contact said supporting member.

29. A flat cathode ray tube display apparatus comprising:
an evacuated envelope having flat mutually opposing first and second portions, with at least said first envelope portion being optically transparent and having a photo-emissive layer of a fluoresent material formed over a rectangular region of an inner surface of said first envelope portion, said rectangular region having respective sides thereof extending in a horizontal and a vertical direction, and with a set of vertical scanning deflection electrodes formed as elongated conductive strips arrayed with a fixed pitch upon an inner surface of said second envelope portion;
an electron gun disposed within said envelope, extending between said first and second envelope portions, for emitting a plurality of electron beams, each of thin linear shape, into a region between said vertical scanning deflection electrodes and photo-emissive layer said electron beams being each aligned in said vertical direction and successively arrayed along said horizontal direction with a fixed pitch;
means for applying scanning voltages to said vertical scanning deflection electrods for producing a common deflection of said electron beam towards said photo-emissive layer by successive ones of said vertical scanning deflection electrodes;

modulation electrode means for modulating respective ones of said plurality of electron beams; and deflection electrode means for periodically deflecting said plurality of electron beams together to sweep said electron beams across said photo-emissive layer, following deflection by said vertical scanning deflection electrodes, in which said supporting member is formed of an electrically insulating material, and further comprising a film of electrically conductive material form over a region of said convex contour surface which is placed in contact with said line cathode.

30. A flat cathode ray tube display apparatus comprising:

an evacuated envelope having flat mutually opposing first and second portions, with at least said first envelope portion being optically transparent and having a photo-emissive layer of a fluorescent material formed over a rectangular region of an inner surface of said first envelope portion, said rectangular region having respective sides thereof extending in a horizontal and a vertical direction, and with a set of vertical scanning deflection electodes formed as elongated conductive strips successively arrayed with a fixed pitch upon an inner surface of said second envelope portion;

an electron gun disposed within said envelope, extending between said first and second envelope portions, for emitting a plurality of electron beams, each of thin linear shape, into a region between said vertical scanning deflection electrodes and photo-emissive layer said electron beams being each aligned in said vertical direction and successively arrayed along said horizontal direction with a fixed pitch;

means for applying scanning voltages to said vertical scanning deflection electrodes for producing a common deflection of said electron beam towards said photo-emissive layer by successive ones of said vertical scanning deflection electrodes;

modulation electrode means for modulating repective ones of said plurality of electron beams; and deflection electrode means for periodically deflecting said plurality of electron beams together to sweep said electron beams across said photo-emissive layer, following deflection by said vertical scanning deflection electrodes, in which said supporting member is formed of an electrically insulating material, and further comprising a film of electrically conductive material formed over a region of said convex contour surface which is closely adjacent to a region of said surface that is placed in contact with said line cathode.

31. A flat cathode ray tube display apparatus comprising:

an evacuated envelope having flat mutually opposing first and second portions, with at least said first envelope portion beng optically transparent and having a photo-emissive layer of a fluoresent material formed over a rectangular region of an inner surface of said first envelope portion, said rectangular region having respective sides therof extending in a horizontal and a vertical direction, and with a set of vertical scanning deflection electrodes formed as elongated conductive strips successively arrayed with a fixed pitch upon an inner surface of said second envelope portion;

an elctron gun disposed within said envelope, extending between said first and second envelope portions, for emitting a plurality of electron beams, each of thin linear shape, into a region between said vertical scanning deflection electrodes and photo-emissive layer said electron beams being each aligned in said vertical direction and successively arrayed along said horizontal directon with a fixed pitch;

means for applying scanning voltages to said vertical scanning deflection electrodes for producing a common deflection of said electron beam towards said photo-emissive layer by successive ones of said vertical scanning deflection electrodes;

modulation electrode means for modulating respective ones of said plurality of electron beams; and deflection electrode means for periodically deflecting said plurality of electron beams together to sweep said electron beams across said photo-emissive layer, following deflection by said vertical scanning deflection electrodes, in which said supporting member is formed of a metal, and further comprising a layer of an electrically insulating material formed over a region of said convex contour surfaces which is placed in contact with said line cathode.

32. A flat cathode ray tube display apparatus comprising:

an evacuated envelope having flat mutually opposing first and second portions, with at least said first envelope portion being optically transparent and having a photo-emissive layer of a fluorescent material formed over a rectangular region of an inner surface of said first envelope portion, said rectangular region having respective sides thereof extending in a horizontal and a vertical direction, and with a set of vertical scanning deflection electrodes formed as elongated conductive strips arrayed with a fixed pitch upon an inner surface of said second envelope portion;

an electron gun disposed within said envelope, extending between said first and second envelope portions, for emitting a plurality of electron beams, each of thin linear shape, into a region between said vertical scanning deflection electrodes and photo-emissive layer said electron beams being each aligned in said vertical direction and successively arrayed along said horizontal direction with a fixed pitch;

means for applying scanning voltages to said vertical scanning deflection electrodes for producing a common deflection of said electron beams towards said photo-emissive layer by successive ones of said vertical scanning deflection electrodes;

modulation electrode means for modulating respective ones of said plurality of electron beams; and deflection electrode means for periodically deflecting said plurality of electron beams together to sweep said electron beams across said photo-emissive layer, following deflection by said vertical scanning deflection electrodes, in which said line cathode comprises a length of metal wire having a surface layer of a cathode oxide material formed thereon, and in which said cathode oxide layer is restricted to a region of said line cathode which does not contact said supporting member.

* * * * *